Sept. 9, 1969  P. R. PAYNE  3,465,533
CARGO TRANSPORT APPARATUS USING AIR CUSHION SUPPORT
Filed March 8, 1968

INVENTOR
PETER R. PAYNE

BY *Sughrue, Rothwell, Mion, Zinn & Macpeak*

ATTORNEYS

United States Patent Office 3,465,533
Patented Sept. 9, 1969

3,465,533
CARGO TRANSPORT APPARATUS USING AIR CUSHION SUPPORT
Peter R. Payne, Silver Spring, Md., assignor, by mesne assignments, to Wyle Laboratories, El Segundo, Calif., a corporation of California
Filed Mar. 8, 1968, Ser. No. 711,755
Int. Cl. B63c *3/00, 1/00;* B61d *45/00*
U.S. Cl. 61—67                                    7 Claims

ABSTRACT OF THE DISCLOSURE

A load lifting and carrying apparatus has a frame and a flexible, inflatable diaphragm suspended between frame side members. An air cushion is maintained below the diaphragm to lift and support a load carried on the diaphragm.

BACKGROUND OF THE INVENTION

Field of the invention

This invention relates generally to cargo carrying apparatus of the type adapted to lift, support and move a load over a surface. The invention more particularly relates to a load lifting apparatus of the air cushion or ground effect vehicle type wherein the load is supported on a blanket, lifted and supported above the surface by an air cushion.

Description of the prior art

It has been proposed in the prior art to utilize ground effect or air cushion apparatus in conjunction with load lifting devices. Such prior art apparatus generally utilize a rigid air cushion supported vehicle onto which the load to be carried is placed, or utilize the air cushion to support or inflate a flexible member under which the load is suspended. It has further been proposed in the prior art to utilize several interconnected air cushion supported vehicles and to support a load or cargo between the vehicles on a rigid frame or platform. These vehicles, however, require that the load or cargo to be carried have a shape susceptible of support by a flat surface or at least capable of being suspended by only a limited number of suspension members. Thus, a cargo having the very irregular geometry and structural rigidity throughout its bulk presents serious problems when attempted to be lifted, supported and carried by the prior art apparatus.

SUMMARY OF THE INVENTION

The present invention overcomes the disadvantages of the prior art by utilizing a flexible blanket or diaphragm onto which the load or cargo to be lifted is placed and by providing an air cushion beneath the blanket of a sufficient pressure to inflate the blanket and lift the load supported thereon. Due to the flexible nature of the diaphragm or blanket and the air cushion therebelow, the load or cargo is supported uniformly throughout its area of contact with the blanket. Thus, the cargo may have a very irregular geometry and structural rigidity throughout its bulk and be uniformly supported throughout the area of contact between the cargo and the inflated blanket.

The present invention provides a pair of rigidly spaced side frame members between which an inflatable flexible diaphragm or blanket is suspended. When a load is positioned on the blanket, a compressed or pressurized gas is admitted below the blanket at a sufficient pressure to form an air cushion capable of lifting and supporting the load above the surface below the apparatus. This pressurized air cushion de-forms the blanket such that it conforms to the geometry of the load surface in contact therewith and thus provides a uniform lifting and supporting pressure beneath the load throughout its area of contact with the blanket. By maintaining the air cushion below the blanket, once the load has been lifted, the apparatus may be moved over any relatively uniform surface, such as ground or water, with the entire load vertically supported by the air cushion alone. Further, the apparatus frame members may be either capable of support by surface engaging means such as wheels or the like or may be independently supported by some form of independent ground effect or air cushion means. Thus, once the load has been independently supported by its air cushion, the entire apparatus including the supported load may be moved by any means either independent or self contained from one point to another.

BRIEF DESCRIPTION OF THE DRAWINGS

The many features of the present invention will be pointed out in the following detailed description and claims and illustrated in the accompanying drawings, which disclose, by way of example, the principles of the invention and the best mode which has been contemplated of applying these principles.

DESCRIPTION OF THE PREFERRED EMBODIMENT

In order to point out only one of the wide variety of possible applications of the cargo carrying apparatus of the present invention, the invention will be described in conjunction with use of the apparatus in carrying an extremely large and non-uniform geometrical load such as a ship of the cargo or transport type.

Figure 1:
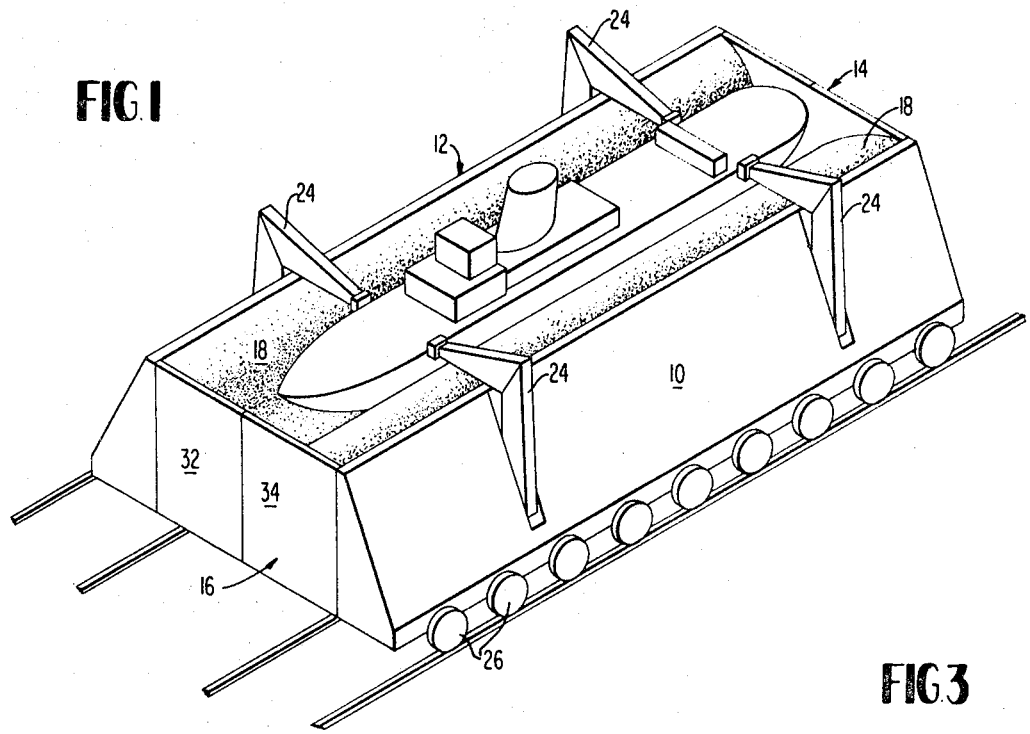
FIGURE 1 is a perspective view of the apparatus of the present invention as employed in transporting a ship.
Figure 2:
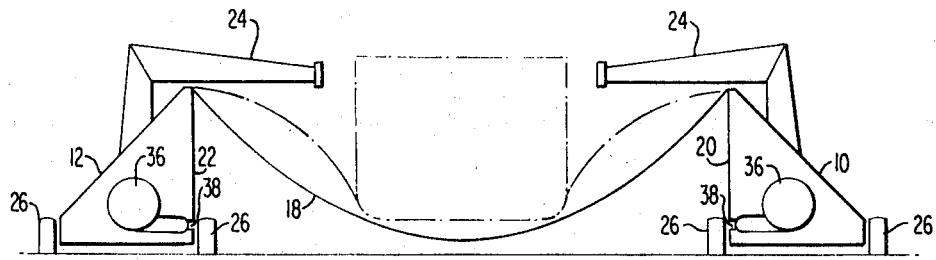
FIGURE 2 is a sectional view of the apparatus illustrating the relaxed and inflated position of the flexible blanket.

Referring specifically to FIGURES 1 and 2, the apparatus of the present invention includes a frame peripherally enclosing a central area. The frame consists basically of a pair of spaced side frame members 10 and 12, a rear frame member 14, a front closure member. A flexible gas impervious diaphragm or blanket 18 is connected at least to the side member 10 and 12. The blanket has sufficient strength to carry the cargo.

The side frame members 10 and 12 have inner longitudinally and vertically extending side walls 20 and 22, respectively, which form substantially gas impervious, pressure sustaining surfaces. The remainder of the side frame members 10 and 12 may be of any suitable geometry, and construction and function to house the lift machinery, fuel tanks, etc. to be discussed below. Each side frame member 10 and 12 is further provided with horizontally and vertically adjustable strut support apparatus 24. The side frame members may be provided with surface engaging wheels 26 of the type adapted to support the apparatus for movement over a flat surface or on rails.

The rear frame member 14 and front closure member 16 function to laterally space the side members 10 and 12. The front closure and the rear frame members 16 and 14, like the side frame members, have inner substantially gas impervious, pressure sustaining surfaces. The front closure member 16 may be comprised of a pair of outwardly swinging gates 32 and 34 which may be selectively opened or closed by any suitable means such as a hydraulic system (not shown).

The flexible gas impervious diaphragm or blanket 18 is secured along its sides to the upper part of the inner side frame members 10 and 12. The surface area is substantially greater than the area defined by the frame, such that in its free state, illustrated by the solid lines of FIGURE 2, the blanket resembles a sling suspended between the side members.

The length of the sides of the blanket 18 are substantially equal to the length of each inner side wall member 20 and 22 such that the front and rear edges of the blanket 18 are in close proximity to the inner surface of the front closure members 16, when closed, and the inner surface of the rear frame member 14. Thus, the apparatus defines a substantially closed volume, bounded on the sides by the side frame members 10 and 12, rear frame member 14, and front closure 16 and at the top by the flexible blanket 18 and on the bottom by the surface over which the apparatus is to be transported.

Figure 3:
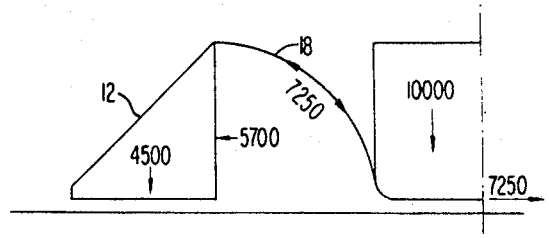
FIGURE 3 is a force diagram illustrating the force, in tons, in one-half of the apparatus when utilized in transporting a ship of a given size.

In order to more fully understand the apparatus of the present invention, reference is made to the force diagram illustrated in FIGURE 3 and the following non-limiting example.

Since a ship is a rather complex structure requiring support under most, if not all, of its bottom, the principal component of the transport apparatus is the blanket 18 on which the ship is supported. The size of the blanket is considerably greater than the deck plan of the ship and is determined by the operating pressure in relation to the combined weight. For example, the blanket 18 might be made of a net of 1⅛ wire rope, 1 foot mesh with a breaking strength of 50 tons per foot, and a suitable covering to produce a gas impervious blanket.

Considering a ship having a length of 500 feet along the water line, a displacement of 20,000 tons and a beam of 80 feet, if the overall length of the side members 10 and 12 of the apparatus is 700 feet and the width of the vehicle is 300 feet and weighs 10,000 tons, the net weight of the ship and transport apparatus combination, per square foot of vehicle area, is ⅐ ton.

If this pressure is applied to the bottom of the ship, it will lift 5,720 tons. Therefore, in order to support the remainder of the ship's weight, as well as the weight of the blanket under the ship, an additional force of 14,500 tons must be supported by a tension in the blanket. Distributed around the length of the water line, this gives a tension in the blanket of 14.5 tons per foot run.

In addition to supporting the excess weight of the ship and blanket thereunder, the blanket 18 can also lift the weight of the two side members 10 and 12 of the vehicle. In such a case, the blanket must lift, per side, a little over 12,000 tons, assuming the weight of the side members is 4500 tons each and the total weight of the blanket is 1000 tons. This requires that the blanket tension at the ship, per side, must equal 7250 tons, and at its point of attachment to the side members 10 and 12, must equal 4500 tons. For this condition to be fully met, it is necessary that the angles of attachment of the blanket to the side members be adjustable. This may be accomplished by utilizing a suitable flexible coupling between the blanket and the side members or by extending the blanket into the side members such that the flexibility of the blanket per se may be utilized for adjusting the angle at which the blanket extends from the side members.

Assuming that the blanket is vertical at the ship, in order to meet the above conditions, the blanket's arc must come to the side members at an angle of 38.5°. When this condition is met, the horizontal component of tension in the blanket is equal to 5700 tons which must be balanced by the pressure on the inner surfaces 20 and 22 of the side members 10 and 12, respectively. At ⅐ ton per square foot, this will require 40,000 square feet of surface area meaning that the side walls must be 57 feet high if they are 700 feet long. Since this is inconveniently high, the strut side support members 24 is provided to react all or part of this load against the opposite side. The strut side support member also functions to compensate for any overturning moments acting on the side members.

In order to provide the necessary air pressure under the blanket 18, the vehicle may employ one or more gas producing engines, such as industrial gas turbine engines which are adapted to deliver their power as exhaust plus pressurized air. The engines 36, mounted in the side frame members 10 and 12, deliver the pressurized gas through air ports 38 under the flexible blanket 18. A buildup of pressure under the flexible blanket 18 causes the blanket to inflate and lift the load supported thereon as illustrated by the dotted lines of FIGURE 2. By maintaining the pressure under the blanket, the air cushion therebelow completely supports the load carried on the flexible blanket.

In operation, assuming it is desirable to transport a large ship from one body of water to another, the transport apparatus would be moved to the vicinity of the ship. The front gates 32 and 34 would be opened and the uninflated blanket would be positioned under the ship's hull by moving the apparatus down a ramp or the like so as to straddle the ship. The front gates would then be closed and the excess water above the blanket would be pumped out by any suitable means. The lift machinery would then be actuated to build up the air pressure under the blanket to a point sufficient to lift and support the ship. The apparatus and its enclosed air cushion supported load could then be moved over any relatively smooth surface to its destination.

Although the above example has been given in reference to only a single size and weight ship, the apparatus of the present invention may be utilized in conjunction with a variety of ship sizes and weights. If the ship to be carried is too heavy, the side walls of the flexible blanket 18 will lift out before the ship is clear of the water. This situation may be readily dealt with by pumping the water ballast into the side walls of the blanket. If, on the other hand, the ship is too light, it will raise out before the side walls are clear and will continue until the angle of the blanket at the side walls is right for lifting them. In this situation, if the ship is very light, the riding position may be uncomfortably high in which case it could be reduced simply by adding water ballast to the ship's tanks or around the ship on the upper side of the blanket.

In order to move the loaded or unloaded transport apparatus, any suitable means either self contained or independent may be employed. For example, if the apparatus is to be moved over a rail system, a plurality of pushing or pulling diesel engines may be employed. Likewise, one or more ground vehicles may be utilized to move the apparatus over a flat roadway or the like. Any suitable self contained power apparatus may also be provided within the vehicle side walls 10 and 12 to drive the surface engaging wheels 26 to provide a self propelled vehicle.

In order to provide longitudinal stability for a carried load, it may be desirable to subdivide areas under the flexible blanket 18 such that the subdivided compartments may be operated at slightly differing pressures and can be adjusted according to the need of the load carried thereon. This may be readily achieved by control of the pressurized air supplied to the various compartments or by utilizing a plurality of gas producing engines operating at different pressures.

While the invention has been particularly shown and described with reference to a preferred embodiment thereof, it will be understood by those skilled in the art that various changes in form and details may be made therein without departing from the spirit and scope of the invention.

What is claimed is:
1. An apparatus using air cushion support for transporting cargo such as ships and the like, comprising:
    a frame peripherally enclosing a central area,
    a flexible blanket substantially longer than the bottom of the cargo sufficiently gas impervious to function as an air cushion containing wall, the blanket connected between at least opposite sides of the frame of sufficient strength to support the cargo on the upper surface thereof, the blanket extending downwardly from the opposite sides to cradle the cargo to be carried, gas producing means carried by the apparatus for supplying gas below the blanket in volume and at pressure sufficient to provide an air cushion in the space of the central area within the frame and under the blanket so that the blanket flexes to provide bottom and at least partial side support for the cargo while the air cushion supports the cargo above the surface.

2. A cargo transport apparatus as in claim 1 further comprising means for supporting the cargo transport apparatus for movement over the surface.

3. A cargo transport apparatus as in claim 1 further comprising the members extending from the frame above the blanket for engaging said cargo to provide side support thereto.

4. A cargo transport apparatus as in claim 1 wherein means are provided by regulating the pressure of the gas supplied below said blankets such that a selected lifting pressure may be maintained throughout the entire area of contact between said cargo and said blanket.

5. A cargo transport apparatus as in claim 1 wherein said gas producing means includes a plurality of gas producing engines.

6. A cargo transport apparatus as in claim 2 the means for supporting the cargo carrying apparatus for movement over the surface includes ground engaging wheels on the side members adapted to movably support said apparatus.

7. A cargo transport apparatus as in claim 1 wherein the frame includes a front member, rear member, and spaced apart side members said front member comprises a pair of outwardly opening gates.

References Cited

UNITED STATES PATENTS

| | | | |
|---|---|---|---|
| 481,405 | 8/1892 | Kinipple | 61—67 |
| 2,819,810 | 1/1958 | De Witt | 214—10.5 |
| 2,896,564 | 7/1959 | Wright | 61—67 X |
| 3,067,699 | 12/1962 | Fredriks | 105—369 |

JACOB SHAPIRO, Primary Examiner

U.S. Cl. X.R.

61—66; 105—369; 214—10.5; 114—45; 280—414